US010242760B2

(12) United States Patent
Clayton

(10) Patent No.: US 10,242,760 B2
(45) Date of Patent: Mar. 26, 2019

(54) SYSTEM AND METHOD FOR GENERATING MOLYBDENUM-99 AND METASTABLE TECHNETIUM-99, AND OTHER ISOTOPES

(71) Applicant: Varian Medical Systems, Inc., Palo Alto, CA (US)

(72) Inventor: James E. Clayton, San Jose, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 448 days.

(21) Appl. No.: 14/949,583

(22) Filed: Nov. 23, 2015

(65) Prior Publication Data

US 2016/0078971 A1 Mar. 17, 2016

Related U.S. Application Data

(62) Division of application No. 12/928,227, filed on Dec. 7, 2010, now Pat. No. 9,196,388.

(Continued)

(51) Int. Cl.
*G21G 1/00* (2006.01)
*G21G 1/02* (2006.01)
(Continued)

(52) U.S. Cl.
CPC .......... *G21G 1/0005* (2013.01); *G21G 1/001* (2013.01); *G21G 1/02* (2013.01); *G21G 1/06* (2013.01); *G21G 1/12* (2013.01); *G21G 1/10* (2013.01); *G21G 2001/0036* (2013.01); *G21G 2001/0042* (2013.01)

(58) Field of Classification Search
CPC .... G21G 1/10; G21G 1/12; G21G 2001/0036; G21G 2001/0042; G21G 1/0005; G21G 1/001; G21G 1/02; G21G 1/06
USPC ....... 376/108, 156, 186, 190, 199, 200, 201; 420/429
See application file for complete search history.

(56) References Cited

U.S. PATENT DOCUMENTS 2,161,985 A 6/1939 Szilard
3,924,137 A 12/1975 Alger
(Continued)

OTHER PUBLICATIONS

Bosland, P. et al., "The Superconducting Prototype Linac for IFMIF", FROAAUO5, Proceedings of SRF2009, 2009, pp. 902-906.

(Continued)

*Primary Examiner* — Jack W Keith
*Assistant Examiner* — Daniel Wasil
(74) *Attorney, Agent, or Firm* — Brandon N. Sklar; Cozen O'Connor

(57) ABSTRACT

Accelerator based systems are disclosed for the generation of isotopes, such as molybdenum-98 ("99Mo") and metastable technetium-99 ("99mTc") from molybdenum-98 ("98Mo"). Multilayer targets are disclosed for use in the system and other systems to generate 99mTc and 98Mo, and other isotopes. In one example a multilayer target comprises a first, inner target of 98Mo surrounded, at least in part, by a separate, second outer layer of 98Mo. In another example, a first target layer of molybdenum-100 is surrounded, at least in part, by a second target layer of 98Mo. In another example, a first inner target comprises a Bremsstrahlung target material surrounded, at least in part, by a second target layer of molybdenum-100, surrounded, at least in part, by a third target layer of 98Mo.

18 Claims, 5 Drawing Sheets

Related U.S. Application Data

(60) Provisional application No. 61/283,676, filed on Dec. 7, 2009.

(51) Int. Cl.

| | |
|---|---|
| ***G21G 1/06*** | (2006.01) |
| ***G21G 1/12*** | (2006.01) |
| *G21G 1/10* | (2006.01) |

(56) References Cited

U.S. PATENT DOCUMENTS

| | | | | |
|---|---|---|---|---|
| 5,737,376 | A | 4/1998 | Hirose | |
| 5,764,715 | A | 6/1998 | Maenchen et al. | |
| 5,874,811 | A | 2/1999 | Finlan et al. | |
| 7,531,818 | B2 | 5/2009 | Brahme | |
| 7,796,720 | B1 | 9/2010 | Rubbia | |
| 8,126,104 | B2 | 2/2012 | Schenter et al. | |
| 2009/0140177 | A1* | 6/2009 | Whittum | G01V 5/0016 250/493.1 |
| 2009/0274258 | A1 | 11/2009 | Holden et al. | |
| 2011/0096887 | A1 | 4/2011 | Piefer | |
| 2011/0129049 | A1 | 6/2011 | Schenter | |
| 2011/0280356 | A1 | 11/2011 | Tsang | |

OTHER PUBLICATIONS

Tanabe, Y. et al., “Feasibility Study on Superconducting System for Intense CW Ion LINAC”, 1996, 3 pages.

McAlister, Daniel et al., “Automated two column generator systems for medical radionuclides”, Applied Radiation and Isotopes 67, 2009, pp. 1985-1991.

Lagunas-Solar, Manuel C. et al., “Cyclotron Production of NCA $^{99M}$Tc and $^{99}$Mo, An Alternative Non-reactor Supply Source of Instant $^{99m}$Tc and $^{99}$Mo → $^{99m}$Tc Generators”, Appl. Radiat5. Isot. vol. 42, No. 7, 1991, pp. 643-657.

* cited by examiner

SYSTEM AND METHOD FOR GENERATING MOLYBDENUM-99 AND METASTABLE TECHNETIUM-99, AND OTHER ISOTOPES

RELATED APPLICATION

The present application is a division of U.S. patent application Ser. No. 12/928,227, which was filed on Dec. 10, 2010 and will issue on Nov. 24, 2015 bearing U.S. Pat. No. 9,196,388, which claims the benefit of U.S. Provisional Patent Application No. 61/283,676, which was filed on Dec. 7, 2009, both of which are assigned to the assignee of the present invention and are incorporated by reference herein.

FIELD OF THE INVENTION

The present invention relates to the generation of molybdenum-99 and technetium-99 from other isotopes of molybdenum.

BACKGROUND

Medical imaging isotopes, such as metastable technetium-99 ("99mTc"), are used in the medical imaging of bone, liver, lung, brain, kidney, and other organs to diagnose medical conditions, including cancer and cardiac conditions. 99mTc is commonly obtained by producing molybdenum-99 ("99Mo"), which decays into 99mTc. 99Mo is currently produced in nuclear reactors outside the United States using Highly Enriched Uranium 235 ("HEU"). The base materials HEU and low enriched uranium ("LEU") are Special Nuclear Materials ("SNMs") that are securely controlled because they can be used to make a nuclear fission explosive device or dirty bomb, for example. 99mTc has also been produced from 99Mo in a reactor by bombarding the 99Mo with a high flux of low energy neutrons.

Because of problems with the world's supply from nuclear reactors, there is a severe shortage of 99mTc. Many nuclear reactors are at or near the end of their lifetimes and need extensive repairs. Tighter regulatory concerns are making it more difficult to keep these systems operational. Nuclear reactors are also very expensive and take many years to build. Currently, many patients who could benefit from imaging procedures using 99mTc, are either waiting in a long queue for it to become available or are not able to have these enhanced procedures performed.

SUMMARY OF THE INVENTION

In accordance with one embodiment of the invention, a method for generating metastable technetium-99 and molybdenum-99 is disclosed comprising accelerating deuterons, bombarding a target material comprising molybdenum-98 by the accelerated deuterons, and generating molybdenum-99 and metastable technetium-99 in the target material. The method further comprises separating molybdenum-99 and metastable technetium-99 from the first and second target material by a first column containing resin with high retention of molybdenum-99 and low retention of metastable technetium-99, and a second column containing resin with high retention of metastable technetium-99 and low retention of molybdenum-99.

In accordance with another embodiment of the invention, a system for generating isotopes is disclosed comprising an accelerator, a source of charged particles coupled to the accelerator to inject charged particles into the accelerator, and a target. The target comprises a first, inner target material comprising a first isotope of a first material and a second, outer target material comprising a second isotope of a second material. The second outer target material at least partially surrounds the first, inner target material, and the second, outer target material defines a passage for accelerated charged particles to the first, inner target material.

The first material and the second material may be the same and the first isotope and the second isotope may be different isotopes of the first material. The first, inner target material and the second, outer target material may be separated by a gap. The first isotope and the second isotope may each comprise molybdenum-98. The first isotope may comprise molybdenum-100 and the second isotope may comprise molybdenum-98. The target may further comprise a layer of hydrogenous material between the first, inner target material and the second, outer target material. The first inner target material may comprise a Bremsstrahlung material, the second target material may comprise molybdenum 100, and the target may further comprise third target material comprising molybdenum-98 at least partially surrounding the second target material.

In accordance with another embodiment of the invention, a system for generating metastable technetium-99 and molybdenum-99 is disclosed comprising an accelerator, a source of deuterons coupled to the accelerator to inject deuterons into the accelerator for acceleration, and a target. The target comprises a first, inner target material comprising molybdenum-98. Bombardment of the first, inner target material by accelerated deuterons during operation generates molybdenum-99 and metastable technetium-99, and releases neutrons. A second, outer target material comprising molybdenum-98 at least partially surrounds the first, inner target material. The second, outer target material defines a passage for accelerated deuterons to the first, inner target material. Impact of the second, outer target material by released neutrons generates molybdenum-99 and metastable technetium-99.

Heat dissipation may be provided. For example, electromagnetic coils may be provided adjacent to the drift tube, to selectively deflect the deuteron beam onto at least two locations on the target, and/or means for rotating the target may be provided. The accelerator may be chosen from the group consisting of a cyclotron, a radio frequency quadrupole accelerator, and a linear accelerator.

A layer of hydrogenous material between the first, inner target layer and the second, outer target layer, may be provided. A gap region may be provided between the first, inner target layer and the layer of hydrogenous material.

In accordance with another embodiment, a method for generating metastable technetium-99 and molybdenum-99 is disclosed comprising accelerating deuterons, bombarding a first target material comprising molybdenum-98 by the accelerated deuterons, generating molybdenum-99 and metastable technetium-99 in the first target material, and capturing neutrons escaping from the target in a second target material comprising molybdenum-98 surrounding, at least in part, the first target material. Molybdenum-99 and metastable technetium-99 in the second target material are generated in second target material. The method further comprises separating molybdenum-99 and metastable technetium-99 from the first and second target material.

The neutrons may pass through a hydrogenous material between the first, inner target material and the second, outer target material, prior to being captured by the second, outer target material. The first, inner target material may be sequentially bombarded by the deuteron beam at a plurality of locations, by, for example, deflecting the deuteron beam by a magnetic field to the plurality of locations, and/or rotating the target. The deuterons may be accelerated by a cyclotron. The technetium-99 and molybdenum-99 may be separated from the target by chromatography.

In accordance with another embodiment of the invention, a target for generation of metastable technetium-99 and molybdenum-99 is disclosed comprising a first target material comprising molybdenum-98 and a second target material comprising molybdenum-98 separate from the first target material. The second target material at least partially surrounds the first target material. A hydrogenous layer may be provided between the first target material and the second target material.

DESCRIPTION OF THE PREFERRED EMBODIMENTS

In one example of an embodiment of the invention, an accelerator based system is disclosed for the generation of molybdenum-98 ("99Mo") and metastable technetium-99 ("99mTc") from molybdenum-98 ("98Mo"). In this example, a target of 98Mo is bombarded by a deuteron beam accelerated by a deuteron accelerator to create the medical isotope, metastable technetium-99 ("99mTc"). Each deuteron in the deuteron beam comprises a proton and a neutron (p, n). 99mTc may be generated via two channels. In the first channel, 98Mo captures a proton of the deuteron, forming 99mTc directly and releasing a neutron (98Mo (d, n)→99mTc). In the second channel, the 98Mo captures the neutron and releases the proton, to form 99Mo (98Mo (d, p),→99Mo), which then decays via beta decay to form the 99mTc (99Mo→99mTc+β+$v_e$ (antineutrino)).

In other examples of embodiments of the invention, multilayer targets are disclosed. The multilayer targets may be used for the generation of isotopes, such as 99Mo and 99mTc, for example.

In one example of a multilayer target, a multilayer target comprises a first, inner target of 98Mo is surrounded by a separate, second outer layer of 98Mo. The inner target is bombarded by a deuteron beam accelerated by a deuteron accelerator to create the medical isotope, metastable technetium-99 ("99mTc"). 99mTc is generated via the two channels described above. When the reaction follows the first channel (98Mo (d, n)→*99mTc), the released neutron may be captured by the outer layer of 98Mo, to generate additional 99Mo and 99mTc, generating additional 99Mo and 99mTc.

Figure 1:
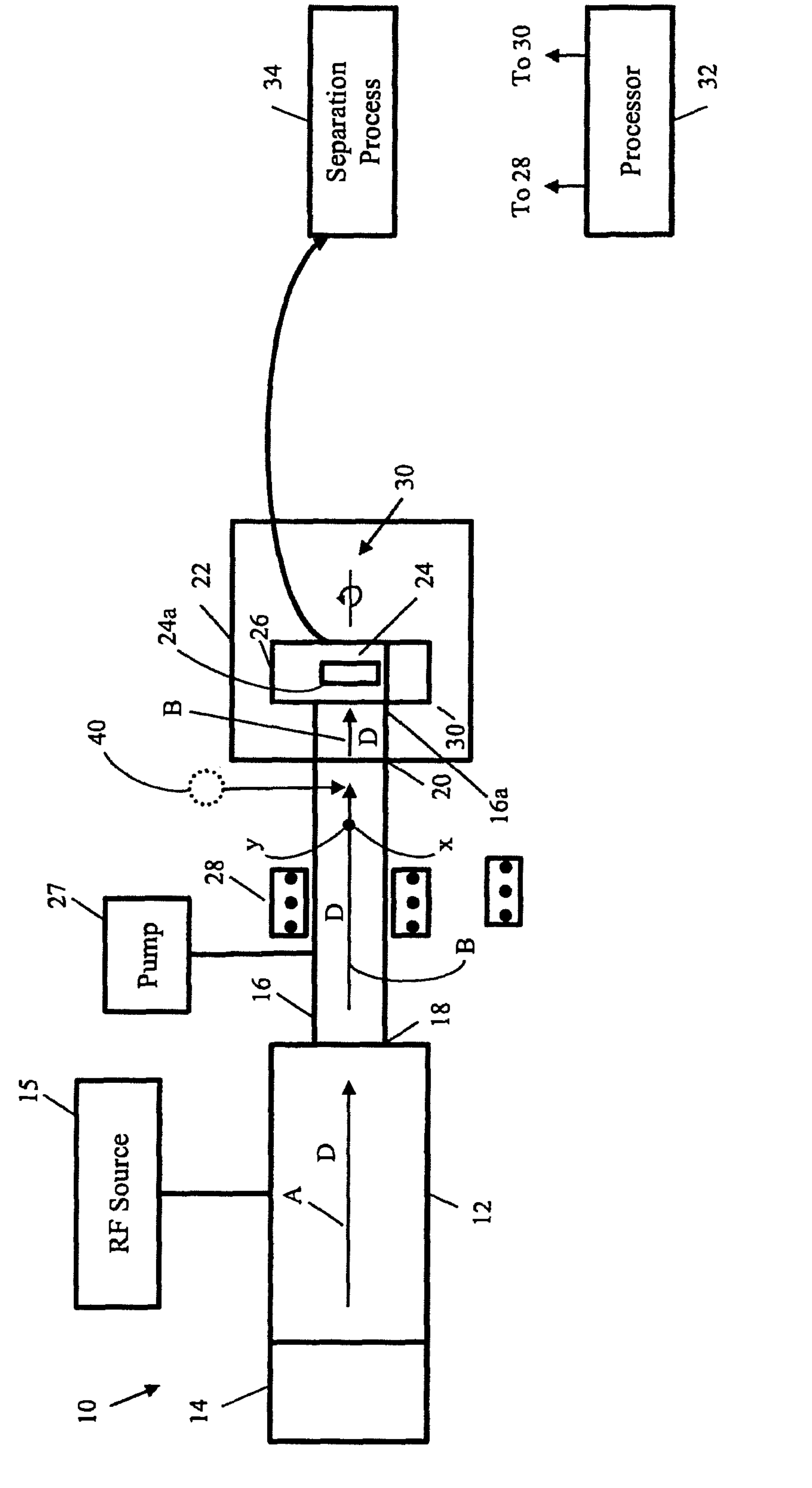
FIG. 1 is a schematic representation of a system for generating 99mTc from 98Mo, in accordance with one embodiment of the present invention.

FIG. 1 is a schematic representation of a system 10 for generating 99mTc from 98Mo, in accordance with one embodiment of the present invention. The system 10 comprises an accelerator 12 and a deuteron source 14 to inject deuterons D into the accelerator for acceleration. An RF source 15 provides radio frequency power to the accelerator 12. The arrow A indicates the direction of the accelerated deuterons D through the accelerator 12. Additional components necessary for the operation of the accelerator 12, such as one or more sources of electrical power to drive the deuteron source 14 and the RF source 15, are not shown. Such components are well known in the art.

A drift tube 16 couples an output 18 of the accelerator 12 to an input 20 of a target chamber 22 for passage of the accelerated deuteron beam D, in the direction of arrow B. The target chamber 22 contains a target 24 within a target assembly 26. The target 24 is water cooled, as is known in the art. In the example of FIG. 1, the drift tube 16 extends into the target chamber 22, to the target assembly 26. In this case only the drift tube 16 and target assembly 26 need be under vacuum. Alternatively, the drift tube 16 only extends to the input 20 of the target chamber 22, in which case the target chamber also needs to be under vacuum. The vacuum may be created by one or more vacuum pumps 27 connected to the drift tube 16, the target chamber 22, and/or the target assembly 26, as needed. The accelerated deuteron beam D impacts the deuteron target 24 in the target assembly 26.

The drift tube 16, or a portion 16*a* of the drift tube, may extend into the target chamber 26. The target 24 may be supported by the portion 16*a*, as shown in FIG. 1. The target 24 may be supported by a platform or other mechanism, instead of the portion 16*a* of the drift tube, as is known in the art.

The target 24 may comprise enhanced 98Mo, having a concentration of over 99%, for example. The concentration of the enhanced 98Mo may be 99.9% or more, for example. Enhanced 98Mo is commercially available from Urenco, Inc., Arlington, Va., for example. The target 24 may be in the shape of a disk, with a flat surface 24*a* perpendicular to the direction B of the deuteron beam.

Figure 2:
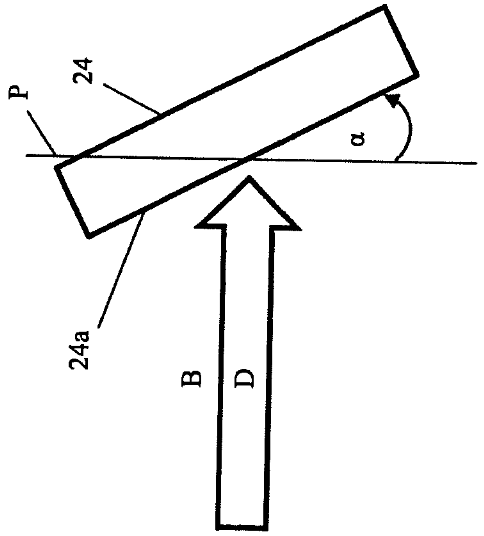
FIG. 2 is a top view of the target of FIG. 1, rotated so that the flat surface is at an oblique angle with respect to the direction of the deuteron beam.

Alternatively, the target 24 may be oriented so that the flat surface 24*a* is not perpendicular to the direction B of the deuteron beam D. FIG. 2 is a top view of the target 24 rotated so that the flat surface 24*a* is at an oblique angle a with respect to the direction B of the deuteron beam D, so that the deuteron beam will impact the target 24 over a larger area than if the surface is perpendicular, helping to dissipate energy and decreasing the risk of deterioration of the target 24. Water cooling is provided, as well, as is known in the art. In FIG. 2, the width of the deuteron beam is shown schematically. An oblique angle a from about 5 degrees to about 20 degrees from line P perpendicular to the direction of the deuteron beam B in FIG. 2, may be provided, for example.

Electromagnetic coils 28 may be provided around the drift tube 16 to selectively deflect the deuteron beam onto different locations on the target 24, so that the deuteron beam is not concentrated on any one portion of the target 24 for too long. The deuteron beam D may be deflected in the X and/or Y dimensions in a plane perpendicular to the direction B of the deuteron beam. In FIG. 1, the X dimension is perpendicular to the page and the Y dimension is a vertical direction. Deflection may be provided in addition to or instead of angling of the target as shown in FIG. 2, along with the water cooling.

The target assembly 22 may include a mechanism 30, indicated schematically in FIG. 1, instead of or along with the magnetic coils 28, to rotate the target 24 about an axis perpendicular to the deuteron beam. Such rotating mechanisms are known in the art. The rotating mechanisms used to rotate target anodes in high power x-ray tubes may be used, for example. For example a motor external to the vacuum may be coupled to the target 24 through a vacuum sealed adapter, such as a liquid metal or ferrofluidic coupler, for example. In another example, a levitation system, such as a turbomolecular vacuum pump 20, may be used. The target chamber 26 may be coupled to the drift tube 16 by a liquid metal or a ferrofluidic coupler (not shown), for example, which allows for rotation of the target chamber while maintaining the vacuum. Target rotation assists in dissipating heat, in addition to the water cooling and optionally other heat dissipation techniques.

Operation of the magnetic coils 28 may be controlled by a processor 32, such as a programmable logic controller, microprocessor, or computer, for example. The processor 32 may be programmed and/or configured to selectively generate electromagnetic fields to deflect the deuteron beam in the X and/or Y dimension, in a predetermined or random pattern. The pattern may be a wobble pattern, for example. If the mechanism 30 is included instead of or along with the electromagnetic coils 28, the processor 32 may also control the mechanism 30, to cause rotation of the target 24. The processor 32 may also control other components of the system 10.

The selected thickness of the target 24 and the full width half maximum of the deuteron beam may depend on the energy of the deuteron beam. In one example, where the accelerator 12 accelerates the deuterons D to 10 MeV and the deuteron beam current is 1 milliamp, the 98Mo target 24 may have a thickness of about 0.016 centimeters. In other examples, where the accelerator 12 accelerates the deuterons D to 15 MeV and 20 MeV, with the same beam current, the target 24 may have a thicknesses of 0.03 cm and 0.049 cm, respectively. At 15 MeV and 1 milliamp beam current, the disk shaped target 24 may have an area of at least about 10 $cm^2$ and a diameter of about 3.6 cm. The full width at half maximum of the deuteron beam D in this example may be 1.4 cm. from about 1 cm to about 5 cm, for example. Over the energy range of 10 meV to 20 MeV and a deuteron beam D current of 1 milliamp, the full width half maximum of the deuteron beam may vary from about 1 cm to about 5 cm, for example.

Figure 3:
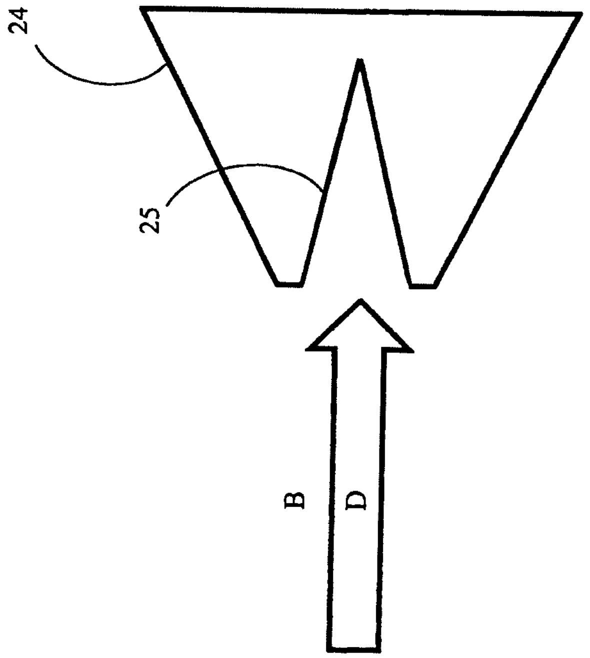
FIG. 3 is a schematic representation of an alternative target for use in the system of FIG. 1.

An alternative target configuration to dissipate heat is shown in FIG. 3, where the target 75 includes an inwardly tapered conical groove 77 to receive the deuteron beam D. The width of the deuteron beam D is indicated schematically in FIG. 3. The tapered conical groove 77 provides two angled surfaces for impact by portions of the deuteron beam, further increasing the surface area for impact, and improving heat dissipation. If the target 75 is used, magnetic deflection of the deuteron beam and target rotation are not needed. Water cooling is provided, as well, as is known in the art.

After the target 24 is bombarded by the deuteron beam for a selected period of time, such as the expected time to saturation of the target 24, either the target or the target chamber 26 is removed from the target assembly 22, and the target 24 or target assembly 26 is replaced by another target or target assembly. The 98Mo target material saturates in about 3 to about 5 half-lives, or from about 198 hours to about 345 hours. The 99Mo and 99mTc are removed from the target 24 by a separation process 34, discussed further below. The separated 99Mo and 99mTc may be bound to a molecule specific to tissue to be examined, as is known in the art.

The accelerator 12 may comprise a cyclotron, a radio-frequency quadrupole ("RFQ") accelerator, a superconducting linear accelerator ("linac"), or a room temperature type linac, for example, configured to accelerate injected deuterons from about 10MeV to about 20MeV. Superconducting linacs are described in Tanabe et al., "Feasibility Study on Superconducting System for Intense CW Ion LINAC," Fifth European Particle Acceleration Conference, Sitges, Spain, 1996, Vol. 3, pp. 2132-2134; and Bosland, et al., "The Superconducting Prototype LINAC for IFMIF," Proceedings of SRF 2009 Berlin, Germany, pp. 902-906 (2009) for example. The RF source 13 may be a klystron, a magnetron, or a tetrode, for example.

The deuteron source 14 may comprise a duoplasmatron, a penning gauge source, or an electron cyclotron resonance source (ECR), for example. A high beam current, of from about 1 milliamp to about 20 milliamps, may be used, for example.

Figure 4:
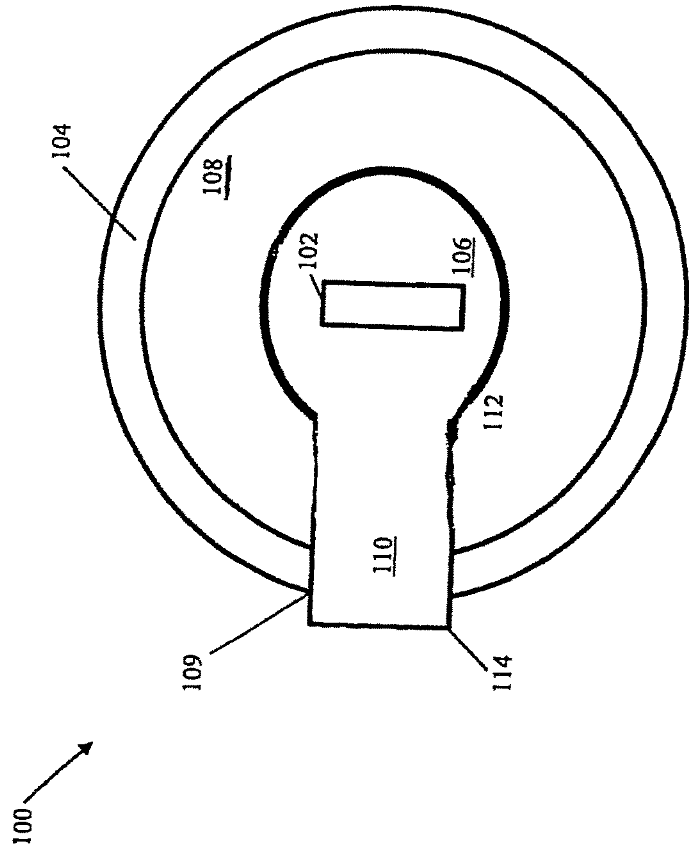
FIG. 4 is a cross-sectional view of an example of a multilayer target in accordance with an embodiment of the invention.

As described above, 98Mo nuclei bombarded by deuterons will release a neutron or a proton, depending on the mechanism. The released neutrons may be captured by another nuclei or 98Mo in the first target 102, or may escape from the first target 102 without being captured. FIG. 4 is a cross-sectional view of a multilayer target 100 in accordance with an embodiment of the invention, to provide increased yield of 99Mo and 99mTc by capturing the escaping neutrons. The target 100 comprises a first, inner target 102 of 98Mo, which may be the same size, shape, and composition as the target 24 of FIG. 1. A second outer target, comprising a layer 104 of 98Mo, surrounds the first, inner target 102. The first, inner target 102 and the second, outer target 104 are separated by a gap region 106. A layer of hydrogenous material 108 may be provided between the first and second targets 102, 104. In the example of FIG. 4, the hydrogenous material 108 is separated from the target 102 by the gap 106, and the second target 104 is provided over the outer surface of the hydrogenous layer 108. A passage 109 is provided through the second, outer target 104 and the hydrogenous layer 108, for the passage of accelerated deuterons toward the first, inner target 102.

A hollow, cylindrical adapter 110 may be provided in the passage 109. The adapter 110 has a first end 112 that extends to or into the gap region 106, facing the first target 102. The diameter of the adapter 110 is sufficient to allow passage of the deuteron beam D. A second end 114 of the cylindrical adapter 110 is configured for attachment to the drift tube 16 or to the target chamber 26 in FIG. 1, to receive the accelerated deuterons. When attached to the drift tube 16 or the target chamber 26 in the system 10, the cylindrical adapter 110 and the gap region 106 are under vacuum.

The second, outer target layer 108 may be about 0.5 cm thick, for example. The hydrogenous layer 108 should be thick enough to slow the fast neutrons into thermal neutrons, facilitating their capture in the second, outer layer 104. The hydrogenous layer 108 may be from about 10 cm to about 20 cm thick, for example. If the first, inner target is to be rotated, a sufficient distance needs to be provided between the first, inner target 102 and the inner surface of the hydrogenous layer 108 or the inner surface of the second, outer target layer 104 when the hydrogenous layer is not provided. A distance of from about 10 mm to about 25 mm, for example is sufficient. If the first, inner target 102 is not to be rotated, the gap can be smaller or no gap need be provided.

In operation, the deuteron beam may be deflected by the electromagnet 28 and/or the first, inner target 102 may be rotated, as discussed above. Impact of the deuteron beam D on the first, inner target 102 results in generation of 99Mo and 99mTc, as discussed above. Neutrons resulting from proton capture by 98Mo in the first inner target material 102 may be captured by other 98Mo atoms in the first inner target material to form 99Mo, or may escape from the first inner target material. Escaping neutrons are intercepted by the layer of hydrogenous material 108. If the neutrons do not have enough energy to pass through the hydrogenous layer 108, such as thermal neutrons, they are absorbed by the hydrogenous material. Neutrons with enough energy to pass through the hydrogenous material 108 enter the outer target layer 104 and may be captured by atoms of 98Mo, forming 99mTc and releasing a gamma ray photon.

Returning to FIG. 1, 99mTc may be removed from the 98Mo target or targets in a separation process 34 known in the art. For example, automated chromatographic techniques may be used, such as those described in McAlister, et al. "Automated two column generator systems for medical radionuclides," Applied Radiation and Isotopes 67 (2009) 1985-1991 ("McAlister"), which is incorporated by reference herein. In McAlister, two chromatographic columns are provided for high chemical and radiochemical purity. The first column contains ABEC-2000 resin, which has high retention of 99mTc and low retention of 99Mo, from sodium hydroxide solution (NaOH). The second column contains Diphonix resin and AG50Wx8 cation exchange resin, which has high retention of 99Mo and low retention of 99mTc, from hydrochloric acid (HC1; 0.5M). ABEC-2000 resin, Diphonix resin, and AG50Wx8 cation exchange resin are available from Eichrom Technologies, LLC, Lisle, Ill. The system is automated system and includes syringe pumps and multipart valves controlled by a computer interface.

In another example, gel based separation methods are described in Saraswathy et al., "99mTc gel generators based on zirconium molybdate-99Mo: III: Influence of preparatory conditions of zirconium molybdate-99Mo gel on generation performance," Radiochim., Acta 92, 259-264 (2004), which is also incorporated by reference herein. Other techniques are described in U.S. Pat. No. 3,833,469 (solution/gas); U.S. Pat. No. 4,123,498 (thermal chromatographic separation); U.S. Pat. No. 4,280,053 (precipitation); U.S. Pat. No. 5,802,439 (vaporization and condensation); and U.S. Pat. No. 5,846,455 (stabilizing aqueous solution - separation), which are also incorporated by reference herein. 99mTc has a short half-life (6.01 hours), and needs to be provided to the location where it will be used quickly. 99Mo has a longer half-life of about 66 hours (2.7489 days) so that there is more time for transport to a hospital, for example.

In an alternative process in accordance with another embodiment of the invention, 99Mo is generated by subjecting target material comprising enriched molybdenum-100 ("100Mo") to a strong source of X-rays, to generate 99Mo via the (y, n) process, which then decays to form 99mTc daughter, as discussed above. The 100Mo target may be enriched to at least 99%. Enriched 100Mo may be obtained from Urenco, Inc., Arlington, Va., for example. The system 10 of FIG. 1 may be used, where the accelerator 12 comprises a linear accelerator, the deuteron source 14 is replaced by an electron source, such as a diode or triode gun, and Bremsstrahlung target material 40, shown in phantom in FIG. 1, is provided in the path of the accelerated electrons, to generate X-rays by impact of the accelerated electron beam, as is known in the art. The Bremsstrahlung target material 40 may comprise tungsten, for example, and may be located within the drift tube 16, as shown in phantom in FIG. 1, where the arrow originating from the target material shows the placement of the target material within the drift tube. Electromagnetic coils and/or target rotation may be provided, as described above. Also as described above, additional components necessary for the operation of the accelerator, such as a source of electrical power, are not shown. Such components are well known in the art.

X-rays resulting from the impact of the accelerated electrons on the target are directed toward the target material 24, which in this case comprises 100Mo. The target material 24 may comprise a multilayer target, such as the multilayer target 100 of FIG. 4, wherein the first, inner target material 102 comprises 100Mo and the second, outer target material/layer 104 comprises 98Mo, via the (γ,n) process. The gap 106 and the hydrogenous material 108 may be the same as described above.

Neutrons escaping from the first target material 102 may be captured by the second, outer layer of 98Mo to generate 99Mo and 99mTc, as discussed above. The 99Mo and 99mTc may be separated from the target by the same separation processes 34 described above.

The energy of the X-ray photons must be greater than 8.29 MeV which is the threshold for this reaction. The peak in the reaction channel is approximately 14 MeV, which is related to the giant dipole resonance, as is known in the art. The accelerator 12, electron source 14, and RF source 15, may be configured to accelerate the electron beam to an energy of from about 25 MeV to about 40 MeV, for example.

Figure 5:
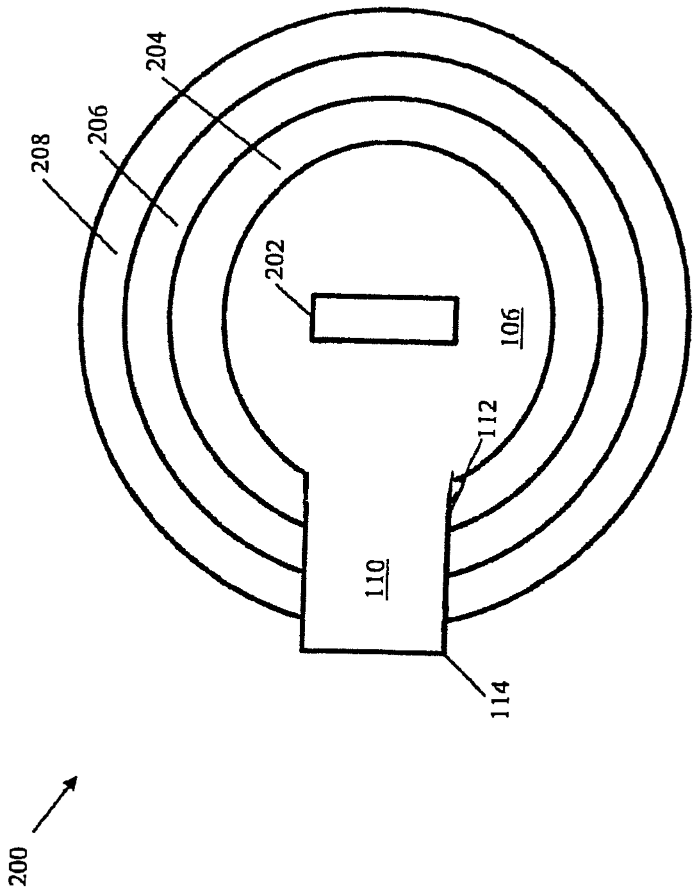
FIG. 5 is a cross-sectional view of another example of a multilayer target in accordance with an embodiment of the invention.

Instead of placing the Bremsstrahlung target material 40 in the drift tube 16, the target material may be center of a multilayer target 200 in the target assembly 26, as shown in FIG. 5. The multilayer 200 comprises a first, inner target layer of the first, Bremsstrahlung target material 202, such as tungsten. An optional gap 106 is shown around the target 202 if the target is to be rotated, as described above. A second target layer 204 of 100 is provided around the first target 202. An optional layer of hydrogenous material 206 may be provided over the second target layer 204. A third target layer 208 of 98Mo is provided over the hydrogenous material 206, if present. If the hydrogenous material 206 is not provided, then the third target layer 208 may be provided over the second target layer 204. The hydrogenous material 206 may be polyethylene and the target layers may be enriched, as discussed above.

Impact of the first, Bremsstrahlung target material 40 by the accelerated electrons causes generation of X-rays, which are emitted in all directions. The X-rays impact the first target layer 204 of 100Mo causing generation of 99Mo, which decays to form 99mTc, as discussed above. Neutrons released and escaping from the second target layer 206 pass through the hydrogenous layer 206, if present, to the third target layer 208 of 98Mo. Capture of the neutrons causes generation of 99Mo, which decays into 99mTc.

In another example, 100Mo is the Bremsstrahlung target material, which is directly bombarded by the accelerated electrons. In that case, the multilayer target may have the configuration of FIG. 4, where the first, inner target 102 comprises 100Mo and the second, outer target 104 comprises 98Mo. In this case, the 100Mo target may have a thickness of at least three radiation lengths, which for 100Mo is about 0.9 cm. The target materials may be enriched, as discussed above.

One of ordinary skill in the art will recognize that other changes may be made to the embodiments described herein without departing from the scope of the invention, which is defined by the claims, below.

I claim:

1. A system for generating isotopes, comprising:

an accelerator;

a source of charged particles coupled to the accelerator to inject charged particles into the accelerator;

a target positioned in the path of the accelerated charged particles, the target comprising:

a first, inner target material comprising a first isotope of molybdenum; and a second, outer target material comprising a second isotope of molybdenum, the second outer target material at least partially surrounding the first, inner target material, the second, outer target material defining a passage for accelerated charged particles to the first, inner target material.

2. The system of claim 1, wherein the first isotope and the second isotope are different isotopes of molybdenum.

3. The system of claim 2, wherein the first, inner target material and the second, outer target material are separated by a gap.

4. The system of claim 1, wherein the first isotope and the second isotope each comprise molybdenum-98.

5. The system of claim 2, wherein the first isotope comprises molybdenum-100 and the second isotope comprises molybdenum-98.

6. The system of claim 1, wherein the target further comprises a layer of hydrogenous material between the first, inner target material and the second, outer target material.

7. The system of claim 1, wherein:

the first inner target material comprises a Bremsstrahlung material;

the second target material comprises molybdenum 100; and the target further comprises third target material comprising molybdenum-98 at least partially surrounding the second target material.

8. The system of claim 1, further comprising:

a target assembly containing the target;

a target chamber containing the target assembly; and a drift tube coupling an output of the accelerator to the target chamber, defining the path from the accelerator to the target.

9. The system of claim 8, further comprising:

electromagnetic coils adjacent to the drift tube, to selectively deflect the accelerated charged particle beam onto at least two locations on the target.

10. The system of claim 1, wherein the accelerator is chosen from the group consisting of a cyclotron, a radio frequency quadrupole accelerator, and a linear accelerator.

11. The system of claim 1, further comprising:

means for rotating the target.

12. The system of claim 1, wherein the source of charged particles comprises a source of deuterons.

13. The system of claim 12, wherein:

the accelerated charged particles comprise accelerated deuterons;

the first, inner target material comprises molybdenum-98, wherein bombardment of the first, inner target material by the accelerated deuterons during operation generates molybdenum-99 and metastable technetium-99, and releases neutrons; and the second, outer target material comprises molybdenum-98, wherein impact of the second, outer target material by the released neutrons generates molybdenum-99 and metastable technetium-99.

14. The system of claim 13, wherein the target further comprises:

a layer of hydrogenous material between the first, inner target material and the second, outer target material.

15. The system of claim 14, wherein the target defines a gap region between the first, inner target material and the layer of hydrogenous material.

16. The system of claim 1, wherein the source of charged particles comprises a source of electrons.

17. The system of claim 1, further comprising:

an electromagnetic coil adjacent to the path of the accelerated charged particles;

the electromagnetic coil being configured to selectively, sequentially deflect the accelerated charged particles to impact the first, inner target material at respective different locations.

18. The system of claim 1, wherein the first, inner target material is at an oblique angle with respect to a direction of the accelerated charged particles.

* * * * *